US008711392B2

(12) United States Patent
Inoue

(10) Patent No.: US 8,711,392 B2
(45) Date of Patent: Apr. 29, 2014

(54) INFORMATION PROCESSING APPARATUS, INFORMATION PROCESSING METHOD, AND PROGRAM

(75) Inventor: Yuuki Inoue, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1310 days.

(21) Appl. No.: 11/829,714

(22) Filed: Jul. 27, 2007

(65) Prior Publication Data

US 2008/0037059 A1 Feb. 14, 2008

(30) Foreign Application Priority Data

Aug. 9, 2006 (JP) ................................. 2006-216556

(51) Int. Cl.
*G06F 3/12* (2006.01)

(52) U.S. Cl.
USPC ......... 358/1.15; 358/1.1; 358/1.13; 358/1.12; 399/82; 347/19

(58) Field of Classification Search
USPC ............... 358/1.13, 1.15, 1.18, 1.6, 451, 452, 358/537; 370/329; 347/19
See application file for complete search history.

(56) References Cited

U.S. PATENT DOCUMENTS

| 5,053,885 | A | * | 10/1991 | Telle | 358/449 |
| 5,424,853 | A | * | 6/1995 | Miyaza | 358/451 |
| 5,566,004 | A | * | 10/1996 | Imaizumi et al. | 358/450 |
| 5,946,456 | A | * | 8/1999 | Nakamura | 358/1.12 |
| 5,946,527 | A | * | 8/1999 | Salgado et al. | 399/82 |
| 6,052,207 | A | * | 4/2000 | Takagi et al. | 358/452 |
| 7,065,716 | B1 | * | 6/2006 | Rzepkowski et al. | 715/839 |
| 7,424,238 | B2 | * | 9/2008 | Yamauchi et al. | 399/82 |
| 7,551,311 | B2 | * | 6/2009 | Uotani | 358/1.18 |
| 7,620,012 | B2 | * | 11/2009 | Farineau et al. | 370/329 |
| 7,679,777 | B2 | * | 3/2010 | Contino | 358/1.6 |
| 2002/0051027 | A1 | * | 5/2002 | Kyogoku et al. | 347/19 |
| 2003/0147097 | A1 | * | 8/2003 | Kotani et al. | 358/1.18 |
| 2003/0184806 | A1 | * | 10/2003 | Nara et al. | 358/1.18 |
| 2003/0223094 | A1 | * | 12/2003 | Naito | 358/1.15 |
| 2005/0013621 | A1 | * | 1/2005 | Akita et al. | 399/45 |
| 2006/0262336 | A1 | * | 11/2006 | Venkatachalam et al. | 358/1.13 |
| 2007/0002351 | A1 | * | 1/2007 | Yoshimura et al. | 358/1.13 |
| 2007/0036588 | A1 | * | 2/2007 | Momose | 399/182 |
| 2007/0053027 | A1 | * | 3/2007 | Watanabe | 358/537 |
| 2007/0091330 | A1 | * | 4/2007 | Kim et al. | 358/1.2 |

FOREIGN PATENT DOCUMENTS

| JP | 6-115208 A | 4/1994 |
| JP | 2000-132367 A | 5/2000 |
| JP | 2004-268379 A | 9/2004 |

\* cited by examiner

*Primary Examiner* — Ashish K Thomas
(74) *Attorney, Agent, or Firm* — Canon U.S.A., Inc. IP Division

(57) ABSTRACT

A print area is acquired from a spool file of each page, and the acquired print area is compared with a print area of a target sheet fed from a printing apparatus. It is determined whether the sheet can be replaced with a sheet smaller than a sheet size set in print data. If it is determined that the sheet can be replaced with a sheet smaller than the sheet size set in the print data, a sheet size changing screen showing information concerning replaceable sheet size candidates is displayed in a display unit. A print control command used for changing the sheet size set in drawing information that is input to a sheet size selected on the sheet size changing screen is added to the print data and the print data to which the print control command is added is transmitted to the printing apparatus.

24 Claims, 11 Drawing Sheets

Select condition of replaceable sheet size candidate

Only when all the pages are replaceable

Include rotation of 90°

804  803  802

Cancel    OK

STORAGE MEDIUM SUCH AS
FD OR CD-ROM

| DIRECTORY INFORMATION |
|---|
| FIRST DATA PROCESSING PROGRAM<br>PROGRAM CODE GROUP CORRESPONDING TO STEPS IN FLOWCHART IN FIG. 3 |
| SECOND DATA PROCESSING PROGRAM<br>PROGRAM CODE GROUP CORRESPONDING TO STEPS IN FLOWCHART IN FIG. 4 |
| THIRD DATA PROCESSING PROGRAM<br>PROGRAM CODE GROUP CORRESPONDING TO STEPS IN FLOWCHART IN FIG. 7 |

INFORMATION PROCESSING APPARATUS, INFORMATION PROCESSING METHOD, AND PROGRAM

BACKGROUND OF THE INVENTION

1. Field of the Invention

The present invention relates to data processing in an information processing apparatus that transmits print data to a printing apparatus.

2. Description of the Related Art

Printer drivers managed by the operating systems (OS's) of information processing apparatuses generate print data that can be printed by printing apparatuses from drawing information supplied from the OSs and transmit the generated print data to the printing apparatuses. Users of the information processing apparatuses set, for example, the sizes of sheets used for printing, orientations, and margins of pages to the print data with driver user interfaces (UIs) provided by the printer drivers. The printer drivers add print instruction information about the sizes of the sheets, the orientations, and the margins of pages, set with the driver UIs, to the print data to be transmitted to the printing apparatuses.

The printing apparatuses usually select the sheets having the sizes indicated by the printer drivers to perform printing on the selected sheets.

However, if the print areas of documents and/or images in the print data are extremely smaller than the sizes of the sheets indicated in the print instruction information, margins of the sheets where the print data is not printed are wasted. For example, if a user selects an A3 sheet to print a one-page document that is small enough to fit in a B5 sheet on the selected A3 sheet, a blank space larger than the B5 size remains on the sheet.

In order to resolve such a problem, in methods in related art, the print areas are generally enlarged or reduced in accordance with the sizes of sheets set with the driver UIs to avoid waste of the sheets.

For example, Japanese Patent Laid-Open No. 2004-268379 discloses a printing apparatus that automatically selects a sheet optimal for print data having no page break to print the print data.

In the printing apparatus disclosed in Japanese Patent Laid-Open No. 2004-268379, a sheet having the number of printout characters most close to the optimal number of printout characters, that is, a sheet of a size having a minimum margin where the print data is not printed is selected as the sheet used for printing.

Japanese Patent Laid-Open No. 6-115208 discloses a printing apparatus capable of automatically determining an optimal size of a sheet on which resource file data including image data or form data is printed.

The printing apparatus disclosed in Japanese Patent Laid-Open No. 6-115208 detects the sizes of multiple sheets set in a sheet feeder having size information including at least information concerning the heights and widths of the sheets. The printing apparatus receives the resource file data including the image data or form data and stores the received resource file data. In order to convert the resource file data into print image data on the basis of the size information, the printing apparatus selects a smallest sheet from among the detected sheets having sizes larger than the size of the print image data, set in the sheet feeder.

However, Japanese Patent Laid-Open No. 2004-268379 describes sheet selection in processing of character data but does not describe the sheet selection in processing of image data. Pages including both the character data and the image data are not processed by the printing apparatus disclosed in Japanese Patent Laid-Open No. 2004-268379. In addition, a sheet can be selected only from the sheets set in the printing apparatus.

The printing apparatus disclosed in Japanese Patent Laid-Open No. 6-115208 can only process the image data and form data having the height and width information and a sheet can be selected only from the sheets set in the sheet feeder.

In addition, since the print data is enlarged or reduced in accordance with the sheet size in control of the sheet selection in order to minimize the margins, there is a problem in that images or texts having sizes that are not intended by users are printed.

There are cases in which users can select types of sheets used for printing in accordance with the purposes of files to be printed. Furthermore, not only plain paper but also special media, such as photographic paper or compact disc-recordables (CD-Rs), are increasingly used in printing apparatuses. Selection of sheets only on the basis of the print area causes a problem in that data can be printed on such special media that are not intended by users.

SUMMARY OF THE INVENTION

The present invention provides a mechanism capable of printing print data on a sheet having a size selected from sheet size candidates which are smaller than a sheet size that is set and on which the print data can be printed.

According to an embodiment of the present invention, an information processing apparatus includes an acquisition unit configured to acquire a print area of an image; a display unit configured to display a plurality of sheet candidates which are smaller than a sheet size set in a print setting and on which the image of the print area acquired by the acquisition unit can be printed; and a changing unit configured to change the print setting so as to print the image on a sheet selected from the sheet candidates displayed in the display unit.

According to another embodiment of the present invention, an information processing method includes acquiring a print area of an image; displaying a plurality of sheet candidates which are smaller than a sheet size set in a print setting and on which the image of the acquired print area can be printed; and changing the print setting so as to print the image on a sheet selected from the displayed sheet candidates.

According to another embodiment of the present invention, a program includes computer-executable instructions for acquiring a print area of an image; computer-executable instructions for displaying a plurality of sheet candidates which are smaller than a sheet size set in a print setting and on which the image of the acquired print area can be printed; and computer-executable instructions for changing the print setting so as to print the image on a sheet selected from the displayed sheet candidates.

According to the present invention, since replaceable sheet size candidates which are smaller than the sheet size that is set and on which print data can be printed are displayed and a sheet size selected from the replaceable sheet size candidates is set in the print data in order to perform printing without wasting the space on the sheet.

Further features and aspects of the present invention will become apparent from the following description of exemplary embodiments with reference to the attached drawings.

BRIEF DESCRIPTION OF THE DRAWINGS

FIG. 12 illustrates a memory map of a storage medium storing various data processing programs which the information processing apparatus according to the embodiments of the present invention can read.

DESCRIPTION OF THE EMBODIMENTS

Various embodiments of the present invention will now herein be described with reference to the attached drawings.

First Exemplary Embodiment

[Example of Hardware Configuration of Information Processing Apparatus]

Figure 1:
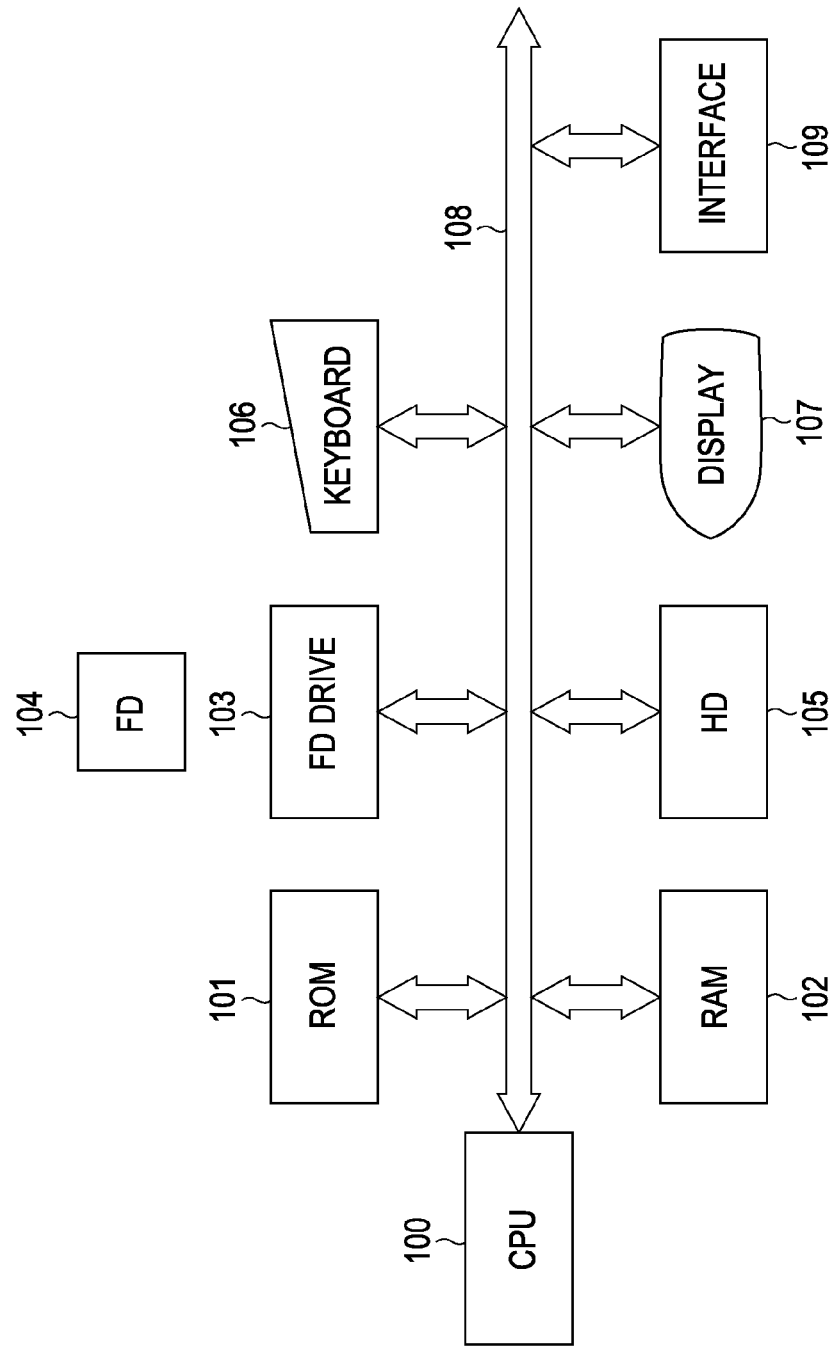
FIG. 1 is a block diagram showing an example of the configuration of an information processing apparatus according to a first embodiment of the present invention.

FIG. 1 is a block diagram showing an example of the configuration of an information processing apparatus according to a first embodiment of the present invention. The information processing apparatus is configured so as to be capable of communicating with a printing apparatus via a network interface or a bidirectional interface.

The printing apparatus is provided with a sensor that detects the size and type of a sheet. The printing apparatus has a function of indicating the detected size and type of the sheet to the information processing apparatus in response to a request to acquire print resource information, transmitted from the information processing apparatus. The type of a sheet is, for example, photographic paper or plain paper, and the sheet can be fed as a sheet supported by a printer driver in accordance with the purpose of printing. Two or more types may be supported depending on the number of colors of ink used in the printing apparatus.

Referring to FIG. 1, a central processing unit (CPU) 100 controls each device in the information processing apparatus via a system bus 108. The CPU 100 executes application programs, a printer driver program, the operating system (hereinafter referred to as the OS), and a network printer control program according to an embodiment of the present invention, which are stored in a hark disk (HD) 105. The CPU 100 temporarily stores information and files necessary for the execution of the programs in a random access memory (RAM) 102.

A read only memory (ROM) 101 serves as a storage unit and stores programs including a basic I/O program and a variety of data including font data and template data used in processing of documents. The RAM 102 serves as a temporary storage unit and functions as a main memory and a working area of the CPU 100. The RAM 102 also includes an area in which variables used for calculating a print area from print data generated by the printer driver are stored.

A flexible disk (FD) drive 103 serves as a storage medium reading unit. The FD drive 103 reads out, for example, a program stored in a flexible disk (FD) 104 and loads the readout program in the information processing apparatus. The FD 104 serves as a storage medium. Computer-readable programs are stored in the FD 104.

It is noted that the storage medium is not limited to the flexible disk and may be, for example, a compact disc-read only memory (CD-ROM), a compact disc-recordable (CD-R), a compact disc-rewritable (CD-RW), a personal computer (PC) card, a digital versatile disk (DVD), an integrated circuit (IC) card, a magneto-optical disk (MO), or a memory stick.

The HD 105 is an external storage unit and functions as a high-capacity memory. The HD 105 stores the application programs, the printer driver program, the OS, the network printer control program, and related programs.

A keyboard 106 serves as an instruction input unit. The keyboard 106 is used by a user who inputs an instruction, such as a control command for a device, into a client computer. The keyboard 106 is also used by a user or an administrator who inputs such an instruction into a print server.

A display 107 serves as a display unit. A command input with the keyboard 106 or a state of the printing apparatus is displayed in the display 107.

The system bus 108 is used for controlling the data flow in the information processing apparatus. An interface 109 serves as an input-output unit. The information processing apparatus transmits and receives data to and from an external apparatus through the interface 109.

[Example of Configuration of Printing System]

Figure 2:
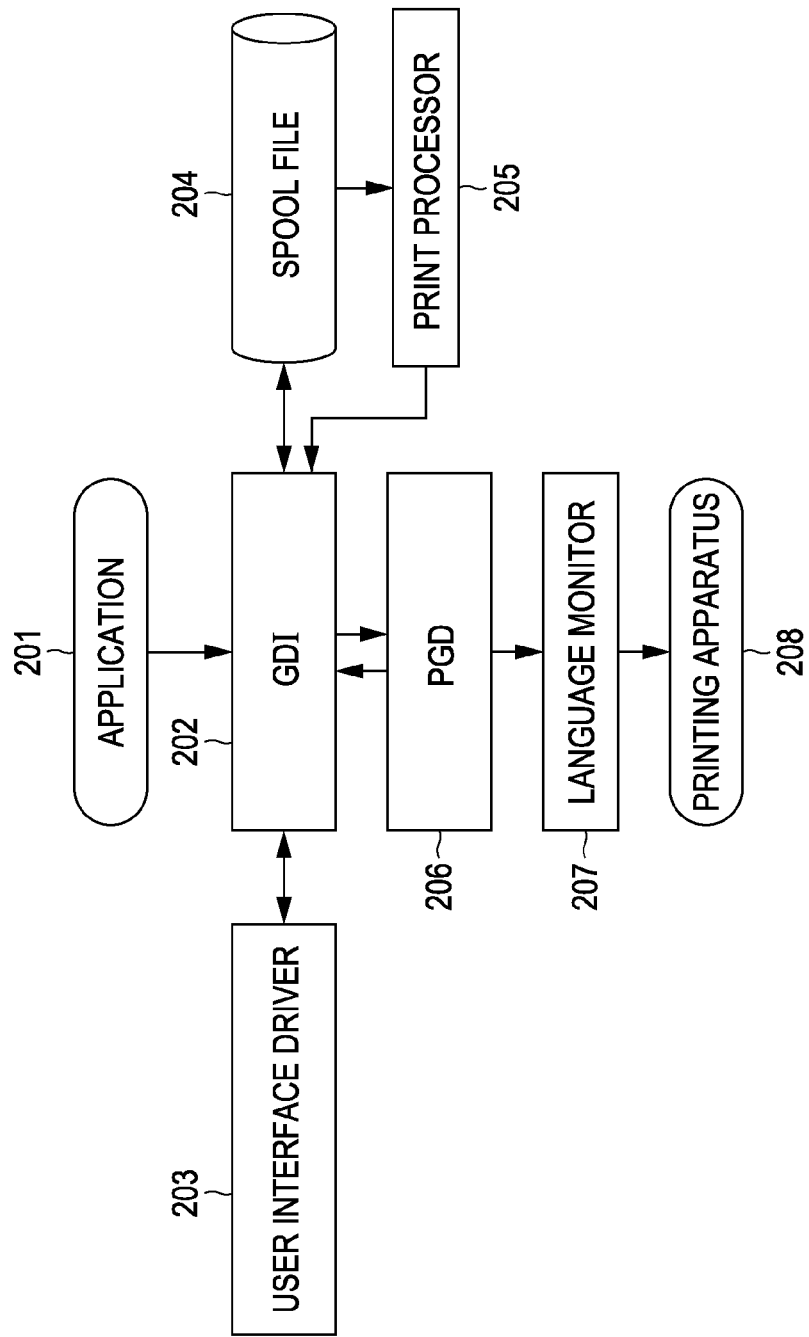
FIG. 2 is a block diagram schematically showing an example of the configuration of a printing system to which the information processing apparatus shown in FIG. 1 is applied.

FIG. 2 is a block diagram schematically showing an example of the configuration of a printing system to which the information processing apparatus shown in FIG. 1 is applied. The information processing apparatus is, for example, a common personal computer. The information processing apparatus uses Microsoft Windows® as the OS. An arbitrary application 201 having a printing function may be installed in the information processing apparatus to which a printing apparatus 208 may be connected. The OS is not limited to Microsoft Windows.

The application 201 sets print setting information for the printing apparatus 208 through a graphics device interface (GDI) 202. The print setting information is information necessary for printing and indicates, for example, a type of a sheet on which the printing apparatus 208 prints a page generated by the application 201, a size of the sheet, and a paper feed tray.

A user interface driver 203 indicates a list of choices that can be set with the print setting information to the application 201 via the GDI 202 and has an interface through which various print settings can be set.

Drawing data which the application 201 requests the printing apparatus 208 to print is supplied to a printer graphic driver (PGD) 206 through the GDI 202, which is a drawing module in the OS. The drawing data which the application 201 requests the printing apparatus 208 to print is print data, such as document data or image data.

The PGD 206 generates a print job from the drawing data and the generated print job is supplied to the printing apparatus 208 as a print request.

Usually, the GDI 202 temporarily spools the data in a spool file 204 as enhanced metafile (EMF) data (a spooling process of the OS). After the spooling process is completed, the GDI 202 submits a print request to a print processor 205.

The print processor 205 reads the print output information and the drawing data from the spool file 204 in units of pages and requests the PGD 206 to output and print the print output information and the drawing data in units of pages through the GDI 202.

The print processor 205 is provided as a module of the OS. However, for example, a manufacturer of the printing apparatus 208 may supply the print processor 205 that is customized, along with the PGD 206, and the supplied print processor 205 and PGD 206 may be installed in the hard disk.

The PGD 206 receives the print request from the print processor 205 and performs rendering. Specifically, the PGD 206 uses a GDI rendering engine, which is a drawing function of the GDI 202, to render the drawing data into raster image data in accordance with the print resolution of the printing apparatus 208.

The raster image data is a multi-value data having colors as multi-stage values. The PGD 206 performs color processing on the basis of the raster image data to generate half-tone data, which is divided into color components corresponding to the colors of ink held by the printing apparatus 208.

Collectively processing the raster image data and the half-tone data corresponding to one page generally requires a remarkably large memory.

Accordingly, the PGD 206 may request the GDI 202 to process the data in units of bands. In this case, the PGD 206 can specify the sizes of the bands. After completing the processing for a certain band, the PGD 206 may request the GDI 202 to change the size of the band.

Alternatively, the PGD 206 may request the GDI 202 to process the data in an unbanding mode in which the processing is performed in units of pages, instead of the banding mode in which the processing is performed in units of bands, and may store the entire drawing data. In this case, the PGD 206 may later output the data in units of bands.

The PGD 206 converts the print setting information into a printer command, adds the printer command to the print data to be printed, and transmits the print data to which the printer command is added to the printing apparatus 208.

Practically, the data output from the PGD 206 is transmitted to a language monitor 207 as a transmission request. The language monitor 207 divides the print job into packets each having a certain size and sequentially transmits the packets to the printing apparatus 208.

When the printing apparatus 208 is a multi-value printing apparatus capable of receiving the multi-value data, the raster image data may be directly transmitted to the printing apparatus 208 or the raster image data may be compressed by a certain method to transmit the compressed data to the printing apparatus 208.

[Example Detailed Processing]

Figure 3:
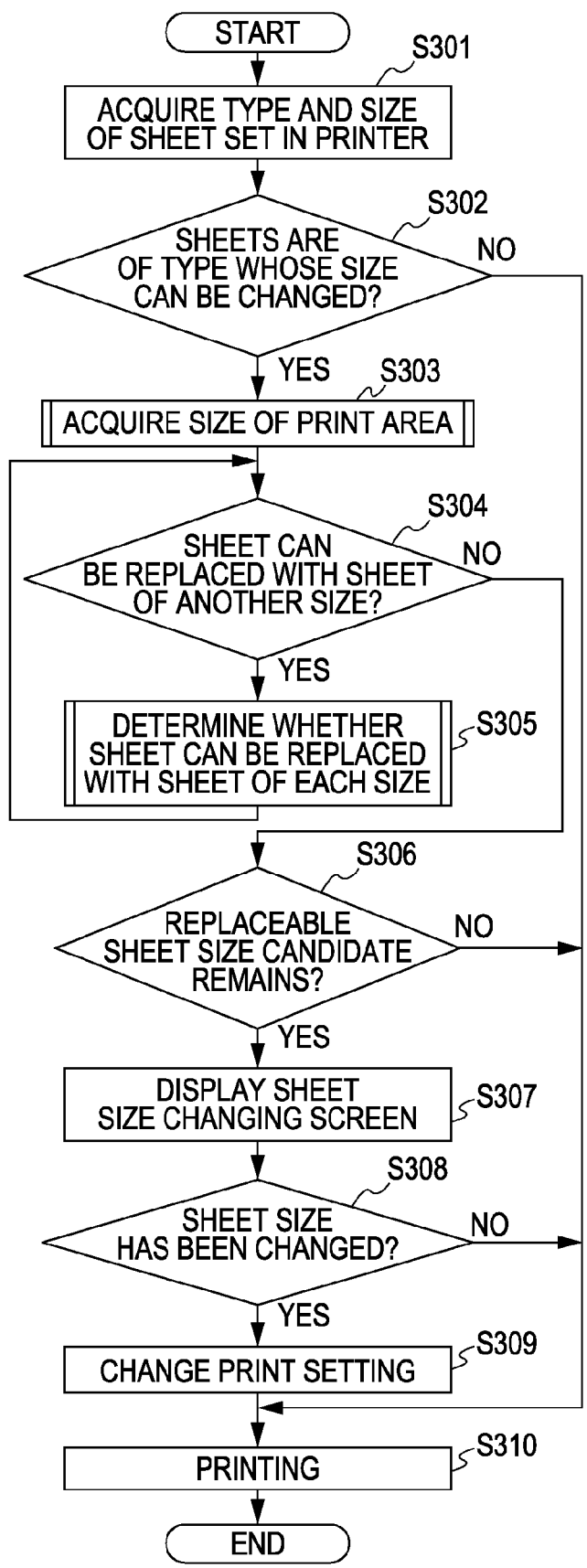
FIG. 3 is a flowchart showing an example of a first data processing procedure in the information processing apparatus according to the first embodiment of the present invention.

FIG. 3 is a flowchart showing an example of a first data processing procedure in the information processing apparatus according to the first embodiment of the present invention. The first data processing procedure corresponds to the entire processing flow of the printing system. S301 to S310 show steps. The steps are realized by the CPU 100, which loads the network printer control program read out from the ROM 101 or the HD 105 into the RAM 102 and executes the loaded network printer control program.

The CPU 100 acquires a type and size of a sheet set in the printing apparatus 208. Current printing apparatuses generally have multiple paper feed trays, such as automatic sheet feeders or cassettes. Some printing apparatuses are provided with sensors capable of determining which sheet is set in the paper feed trays.

As described above, the printing apparatus 208 is capable of communicating with the information processing apparatus via, for example, a network interface. For example, the information processing apparatus communicates with the printing apparatus according to a protocol, such as Simple Network Management Protocol, to acquire a status or resource information from a management information base (MIB) managed by the printing apparatus 208 in response to an acquisition request from the information processing apparatuses. The resource information includes the size of a sheet and a type of a medium housed in a paper feed unit, for example, a paper feed cassette of the printing apparatus 208. The acquired size of the sheet is stored in the RAM 102.

Referring to FIG. 3, in Step S301, the CPU 100 communicates with the printing apparatus 208 to acquire a type and size of a sheet set in the printing apparatus 208.

In Step S302, the CPU 100 determines whether the sheet is of the type whose size can be changed from the information acquired from the printing apparatus 208 in Step S301.

The embodiments of the present invention have a great effect when a document or an image is printed on a common medium (for example, plain paper). In contrast, the embodiments of the present invention have a smaller effect when a document or an image is printed on a special medium (for example, photographic paper or a CD-R) because the user usually prints the document or image for a special purpose. For example, the user sets a sheet of photographic paper on the paper feed tray in order to print a picture.

Referring back to FIG. 3, if the CPU 100 determines that a special medium is set in the paper feed tray, that is, if the CPU 100 determines that the sheet is not of the type whose size can be changed, the CPU 100 goes to Step S310 to perform printing without the first data processing procedure. In other words, when the user feeds a sheet of a special type, priority is given to the printing on a sheet that is selected and the process of replacing a sheet, such as the first data processing procedure, is not performed. As a result, it is possible to print, for example, a picture just as the user intended.

If the CPU 100 determines that a medium of the type whose size can be changed is set in the paper feed tray, that is, if the CPU 100 determines that the sheet is of the type whose size can be changed, the CPU 100 goes to Step S303.

In Step S303, the CPU 100 acquires a size of an area to be printed (print area). According to the first embodiment of the present invention, the size of the print area can be acquired by two methods. The two exemplary methods of acquiring a size of the print area will now be described with reference to FIG. 4.

Figures 4, 4A:
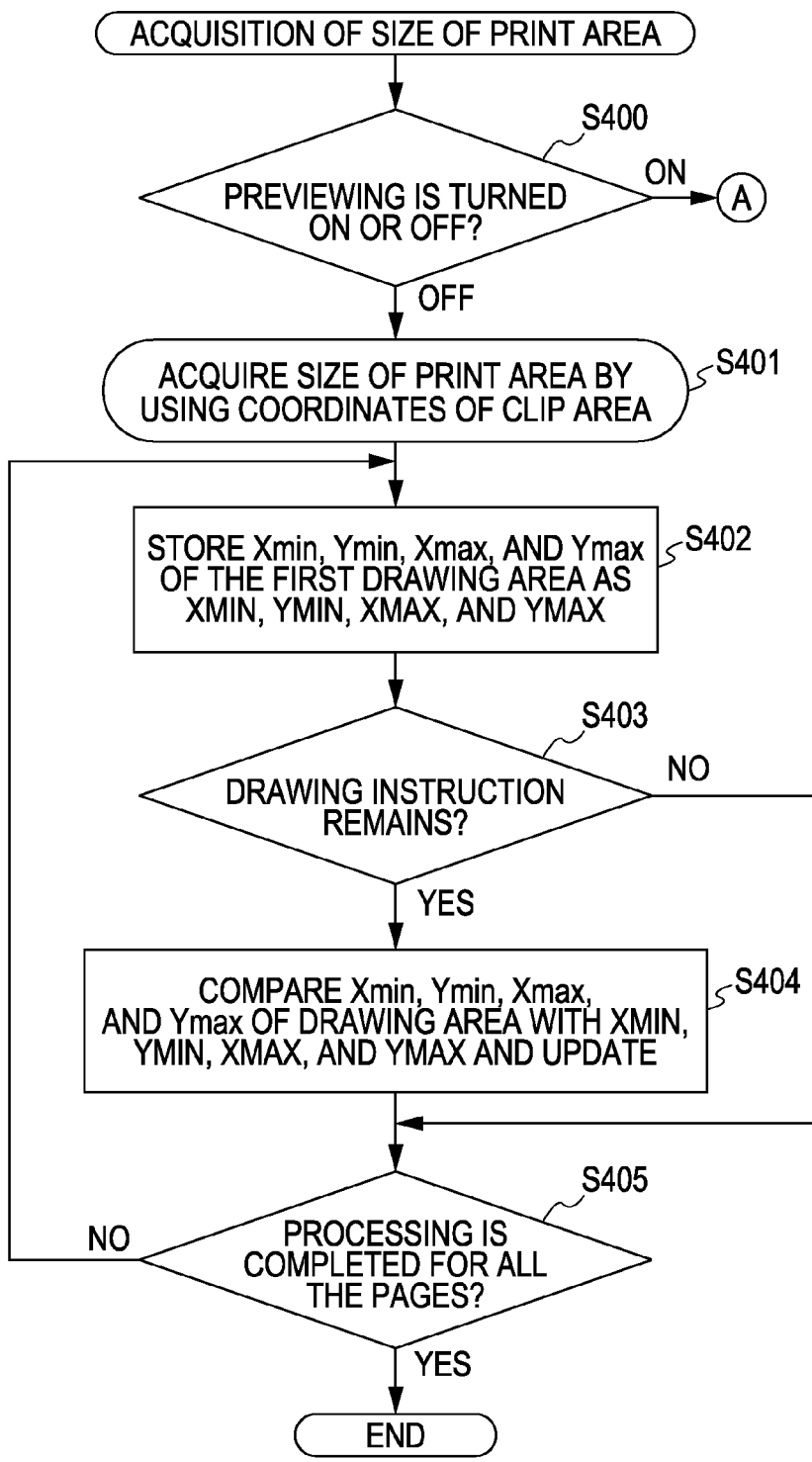
FIG. 4 is a flowchart of an example of a second data processing procedure in the information processing apparatus according to the first embodiment of the present invention.
Figure 4B:
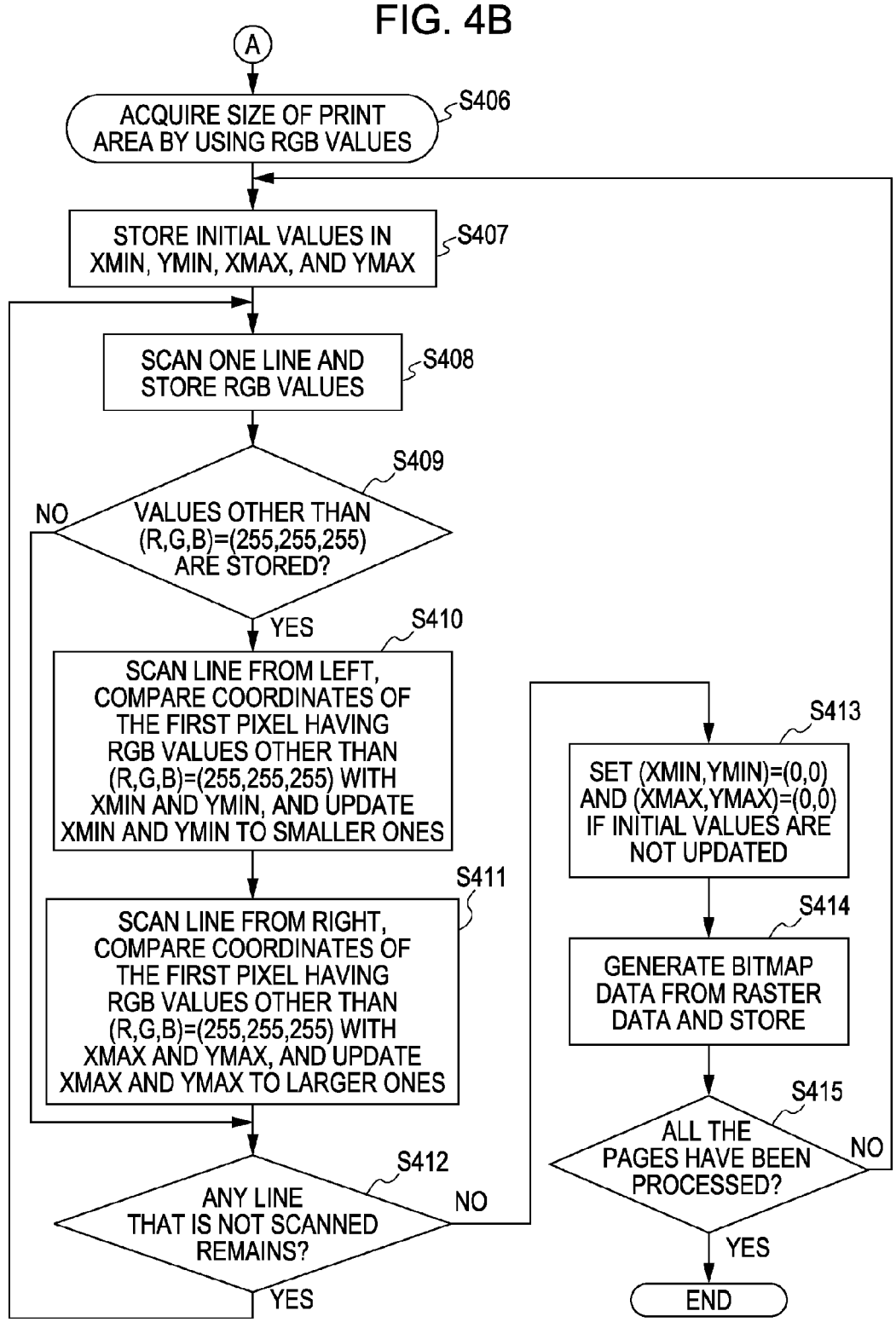

FIG. 4 is a flowchart showing an example of a second data processing procedure in the information processing apparatus according to the first embodiment of the present invention. The second data processing procedure corresponds to the acquisition of a size of the print area in Step S303 in FIG. 3. S400 to S415 show steps. The steps are realized by the CPU 100, which loads the network printer control program read out from the ROM 101 or the HD 105 into the RAM 102 and executes the loaded network printer control program.

The second data processing procedure includes the two methods. In the first method, the CPU 100 acquires a size of the print area of each page by using the coordinates of a clip area yielded from EMF spool data. In the second method, the CPU 100 acquires a size of the print area of each page by using RGB values included in the raster image data.

The first method can be performed at high speed but takes a lot of trouble with conversion of the EMF spool data into the raster image data to show a preview image. In contrast, the second method is slowly performed but can acquire a size of the print area more accurately than the first method. The second method does not take a lot of trouble with the previewing because a size of the print area is acquired from the raster image data.

Accordingly, the two methods are separated on the basis of determination of whether the user instructs to show a preview image with a selection screen. Specifically, if the user does not instruct to show a preview image, a size of the print area of each page is acquired by the first method using coordinates of a clip area. If the user instructs to show a preview image, a size of the print area of each page is acquired by the second method using RGB values.

Referring to FIG. 4, in Step S400, the CPU 100 determines whether previewing is turned on or off on a driver UI provided by the printer driver. Turning of or off the previewing can be set with a button or a check box provided in advance on the driver UI. The CPU 100 stores the setting of the button or check box in the RAM 102 and refers to the stored information to determine whether the previewing is turned on or off.

If the CPU 100 determines in Step S400 that the previewing is turned off, then in Step S401, the CPU 100 uses the first method in which the coordinates of a clip area yielded from the EMF spool data are checked to acquire a size of the print area of each page.

Specifically, the print processor 205 in FIG. 2 transmits the EMF spool data read out from the spool file 204 to the GDI 202. The GDI 202 transmits each piece of the EMF spool data to the PGD 206 as a drawing instruction. The CPU 100 sequentially acquires the coordinates to be drawn from the drawing instructions.

In Step S402, the CPU 100 acquires a drawing area indicated in the first drawing instruction. The CPU 100 stores a minimum X coordinate Xmin of the drawing area as a variable XMIN held in the RAM 102 and a minimum Y coordinate Ymin as a variable YMIN held therein, and stores a maximum X coordinate Xmax as a variable XMAX held in the RAM 102 and a maximum Y coordinate Ymax as a variable YMAX held therein.

In Step S403, the CPU 100 determines whether any drawing instruction remains. If the CPU 100 determines that any drawing instruction does not remain, the CPU 100 goes to Step S405. If the CPU 100 determines that any drawing instruction remains, the CPU 100 acquires the subsequent drawing instruction. In Step S404, the CPU 100 compares the minimum X and Y coordinates Xmin and Ymin with the variables XMIN and YMIN, respectively, and updates the variables XMIN and YMIN to the minimum X and Y coordinates Xmin and Ymin if the minimum X and Y coordinates Xmin and Ymin are smaller than the variables XMIN and YMIN. The CPU 100 compares the maximum X and Y coordinates Xmax and Ymax with the variables XMAX and YMAX, respectively, and updates the variables XMAX and YMAX to the maximum X and Y coordinates Xmax and Ymax if the maximum X and Y coordinates Xmax and Ymax are larger than the variables XMAX and YMAX.

The CPU 100 repeats the comparison until all the drawing instructions in one page are processed. The print area indicated in the print data generated by the printer driver has coordinates (XMIN, YMIN) and (XMAX, YMAX) when all the drawing instructions in one page have been processed. In Step S405, the CPU 100 determines whether the steps S402 to S404 are completed for all the pages, that is, the CPU 100 repeats the steps S402 to S404 until all the pages are processed. The steps S401 to 405 correspond to the first method in which the sizes of the print areas are acquired by using the coordinates of clip areas. A specific example will now be described with reference to FIG. 5.

Figure 5:
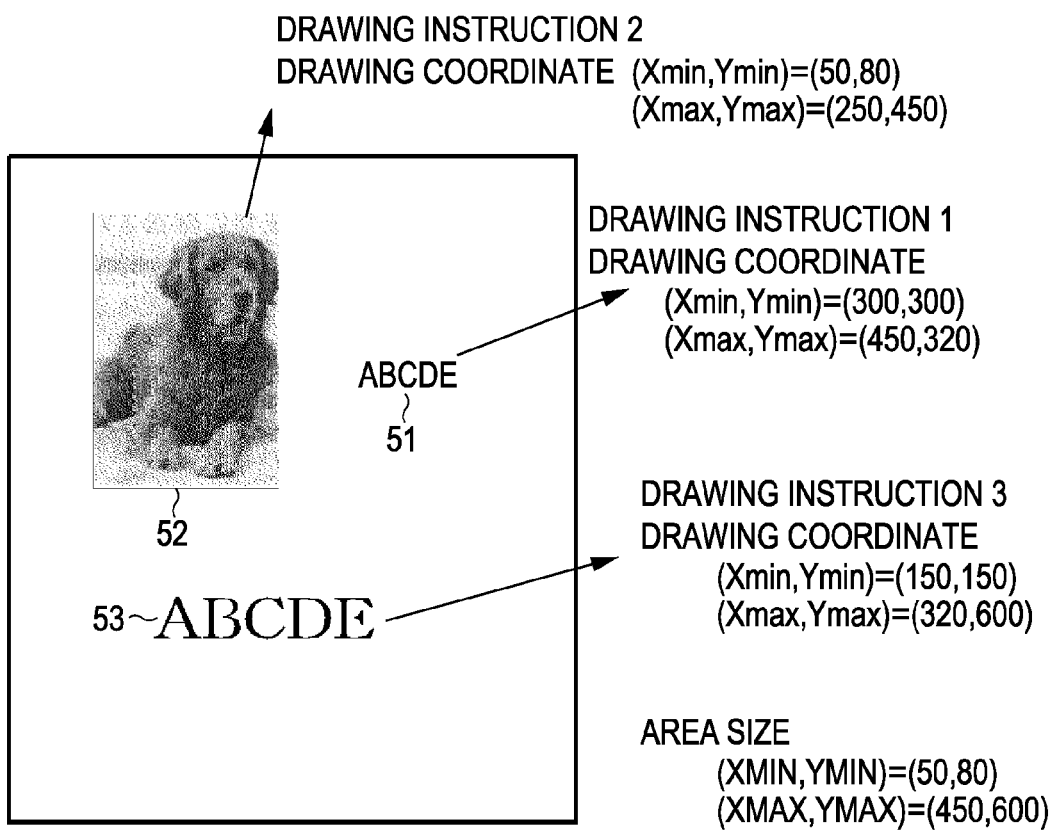
FIG. 5 is a conceptual diagram illustrating an example of the method of acquiring a drawing area shown in FIG. 4.

FIG. 5 is a conceptual diagram illustrating an example of the method of acquiring a print area shown in FIG. 4. Page data shown in FIG. 5 includes character data 51, character data 53, and image data 52. A drawing instruction 1 corresponds to the character data 51, a drawing instruction 2 corresponds to the image data 52, and a drawing instruction 3 corresponds to the character data 53.

First, the drawing instruction 1 is transmitted from the PGD 206. It is assumed that the drawing area indicated in the drawing instruction 1 has coordinates (Xmin, Ymin)=(300, 300) and (Xmax, Ymax)=(450, 320), as shown in FIG. 5. Since the drawing instruction 1 is the first drawing instruction, the coordinates of the drawing area are set as those of the print area, that is, (XMIN, YMIN)=(300, 300) and (XMAX, YMAX)=(450, 320).

Next, the drawing instruction 2 is transmitted from the PGD 206. The drawing area indicated in the drawing instruction 2 has coordinates (Xmin, Ymin)=(50, 80) and (Xmax, Ymax)=(250, 450).

The CPU 100 compares the variable Xmin with the variable XMIN and compares the variable Ymin with the variable YMIN to set the smaller variable Xmin or XMIN as the variable XMIN and to set the smaller variable Ymin or YMIN as the variable YMIN. In the example shown in FIG. 5, the coordinates are set to (XMIN, YMIN)=(50, 80). The CPU 100 compares the variable Xmax with the variable XMAX and compares the variable Ymax with the variable YMAX to set the larger variable Xmax or XMAX as the variable XMAX and to set the larger variable Ymax or YMAX as the variable YMAX. In the example shown in FIG. 5, the coordinates are set to (XMAX, YMAX)=(450, 450).

Next, the drawing instruction 3 is transmitted from the PGD 206. The drawing area indicated in the drawing instruction 3 has coordinates (Xmin, Ymin)=(150, 150) and (Xmax, Ymax)=(320, 600). The comparison is performed in the same manner as in the drawing instruction 2 and the coordinates are set to (XMIN, YMIN)=(50, 80) and (XMAX, YMAX)=(450, 600). The drawing instruction 3 is the final instruction. Accordingly, the final print area has the coordinates (XMIN, YMIN)=(50, 80) and (XMAX, YMAX)=(450, 600).

The CPU 100 performs the above the processing for all the pages and stores the sizes of the print areas of all the pages in the RAM 102. The first method of acquiring the sizes of the print areas is performed in the above manner.

If the CPU 100 determines in Step S400 that the previewing is turned on, for example, if the CPU 100 determines in Step S400 that a radio button with which turning on of the previewing is requested is checked on a UI screen described below, then in Step S406, the CPU 100 uses the second method in which a size of the print area of each page is acquired by using RGB values. The RGB values of each pixel in each page are acquired from the raster image data.

The raster image data is generated by extracting the drawing instruction received by the printer driver on the working area in the RAM 102. The generated raster image data is scanned in units of lines and the RGB values of each pixel are checked to acquire the size of the print area of each page. The raster image data here means raster image data for previewing.

In Step S407, the CPU 100 stores initial values in the variables XMIN, YMIN, XMAX, and YMAX held in the RAM 102. The initial values are set as follows: (XMIN, YMIN)=(xmax, ymax) and (XMAX, YMAX)=(xmin, ymin) where the print area of a sheet that is currently selected is represented by variables xmin, ymin, xmax, and ymax.

In Step S408, the CPU 100 scans the raster image data in one line, checks the RGB values of each pixel in the line, and stores the RGB values. In Step S409, the CPU 100 determines whether RGB values other than (R, G, B)=(255, 255, 255) are stored.

The RGB values (R, G, B)=(255, 255, 255) generally represent white and it is determined that the pixel is not included in the drawing area if the pixel has the RGB values representing white.

If the CPU 100 determines that RGB values other than (R, G, B)=(255, 255, 255) are not stored, the CPU 100 determines that the line is not included in the print area and goes to Step S412. If the CPU 100 determines that RGB values other than (R, G, B)=(255, 255, 255) are stored, the CPU 100 performs the following steps.

In Step S410, the CPU 100 scans the acquired line from left (x=0) to right, checks the RGB values of each pixel in the line, sets the coordinates of the first pixel having RGB values other than (R, G, B)=(255, 255, 255) as variables Xmin and Ymin.

The CPU 100, then, compares the variable Xmin with the variable XMIN to update the variable XMIN to the variable Xmin or XMIN, which is smaller than the other, and compares the variable Ymin with the variable YMIN to update the variable YMIN to the variable Ymin or YMIN, which is smaller than the other.

In Step S411, the CPU 100 scans the acquired line from right (x=xmax) to left, checks the RGB values of each pixel in the line, sets the coordinates of the first pixel having RGB values other than (R, G, B)=(255, 255, 255) as variables Xmax and Ymax.

The CPU 100, then, compares the variable Xmax with the variable XMAX to update the variable XMAX to the variable Xmax or XMAX, which is larger than the other, and compares the variable Ymax with the variable YMAX to update the variable YMAX to the variable Ymax or YMAX, which is larger than the other. The CPU 100 goes to scanning of the subsequent line and repeats the steps S408 to S411 until all the lines are scanned. In Step S412, the CPU 100 determines whether any line that is not scanned remains. If the CPU 100 determines that all the lines have been scanned, the CPU 100 goes to Step S413. If the CPU 100 determines that any line that is not scanned remains, the CPU 100 goes back to Step S408.

The size of the print area is represented by the coordinates (XMIN, YMIN) and (XMAX, YMAX) yielded after all the lines are scanned. In Step S413, if the variables XMAX and YMAX have the initial values, the CPU 100 sets (XMIN, YMIN)=(0, 0) and (XMAX, YMAX)=(0, 0) because the page is a blank page.

In Step S414, the CPU 100 generates a bitmap image from the raster image data and stores the generated bitmap image in order to show a preview image.

In Step S415, the CPU 100 determines whether all the pages have been processed. If the CPU 100 determines that all the pages have not been processed, the CPU 100 goes back to Step S407. If the CPU 100 determines that all the pages have been processed, the CPU 100 stores the size of the print area of each page and terminates the second data processing procedure. The steps S406 to S415 are described in detail with reference to FIG. 6.

Figure 6:
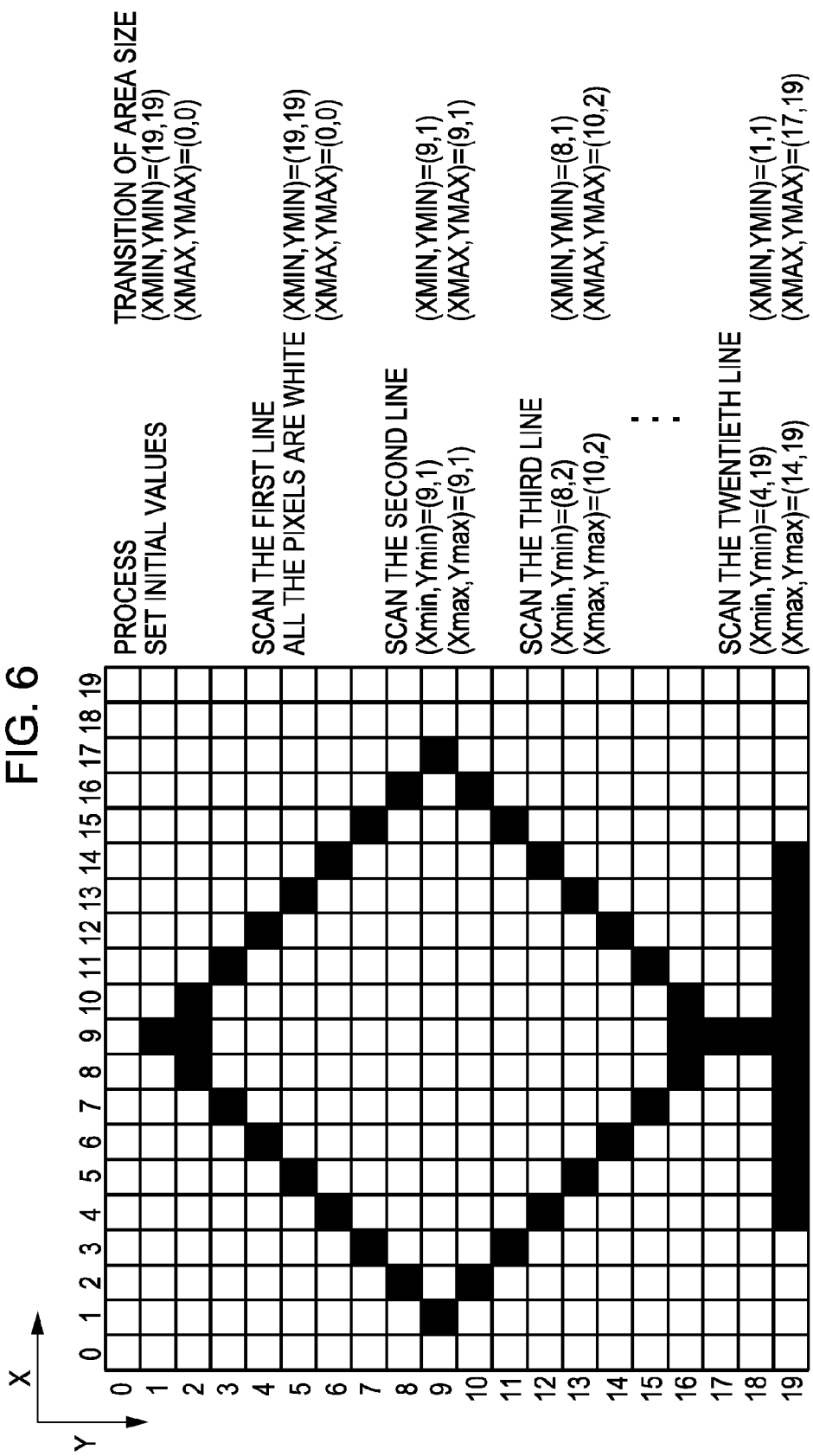
FIG. 6 illustrates a state of raster image data extracted in a RAM shown in FIG. 1.

FIG. 6 illustrates a state of raster image data extracted in the RAM 102. Black squares show pixels having RGB values other than (R, G, B)=(255, 255, 255). The scanning is started from a reference position, which is the upper left corner.

It is presumed that no margin is set for simplicity and that a pattern shown in FIG. 6 is to be printed on a sheet having a printable area of 20×20. In order to acquire a size of the print area, initial values (XMIN, YMIN)=(19, 19) and (XMAX, YMAX)=(0, 0) are set.

Next, the first line is scanned. Since all the pixels in the first line are white, the coordinates of the print area remains unchanged and are expressed as (XMIN, YMIN)=(19, 19) and (XMAX, YMAX)=(0, 0). Next, the second line is scanned. Since the second line includes a pixel that is not white at coordinates (9, 1), the second line is scanned from left to right and (Xmin, Ymin)=(9, 1) is set because the first pixel that is not white has coordinates (9, 1). The variable Xmin is compared with the variable XMIN to set the variable Xmin or XMIN, which is smaller than the other, as the variable XMIN, and the variable Ymin is compared with the variable YMIN to set the variable Ymin or YMIN, which is smaller than the other, as the variable YMIN. As a result, (XMIN, YMIN)=(9, 1) is set.

Next, the second line is scanned from right to left and (Xmax, Ymax)=(9, 1) is set because the first pixel that is not white has coordinates (9, 1). The variable Xmax is compared with the variable XMAX to set the variable Xmax or XMAX, which is larger than the other, as the variable XMAX, and the variable Ymax is compared with the variable YMAX to set the variable Ymax or YMAX, which is larger than the other, as the variable YMAX. As a result, (XMAX, YMAX)=(9, 1) is set.

Since the processing of the second line is completed, the third line is scanned. The third line includes pixels that are not white at coordinates (8, 2), (9, 2), and (10, 2).

Accordingly, since (Xmin, Ymin)=(8, 2), (XMIN, YMIN)= (8, 1) is set. Since (Xmax, Ymax)=(10, 2), (XMAX, YMAX)= (10, 2) is set. Repeating such processing until the twentieth line (the nineteenth line in FIG. 6) provides (XMIN, YMIN)= (1, 1) and (XMAX, YMAX=(17, 19), which represent the size of the print area.

The second method of acquiring the size of the print area is performed in the above manner. Since the CPU 100 has acquired the size of the print area, the CPU 100 goes to Step S304 in FIG. 3.

Now, referring back to FIG. 3, in Step S304, the CPU 100 determines whether the set sheet can be replaced with a sheet of another size. Specifically, the CPU 100 determines whether a sheet of another size is set in the printing apparatus 208 and, if a sheet of another size is set in the printing apparatus, determines whether the sheet is of the type whose size can be changed.

According to the first embodiment of the present invention, the type of the sheet is a common medium, as described above in Step S302.

If a common medium is set in the printing apparatus 208, the CPU 100 determines whether the sheet can be replaced with a sheet of another size. Sheets of different sizes are hereinafter referred to as target sheets to be determined.

The CPU 100 has acquired the type of the sheet set in the printing apparatus 208 in Step S301. Accordingly, if sheets of one or more sizes are set in the printing apparatus 208, in Step S305, the CPU 100 determines whether the sheet can be replaced with a sheet of each size.

Figure 7:
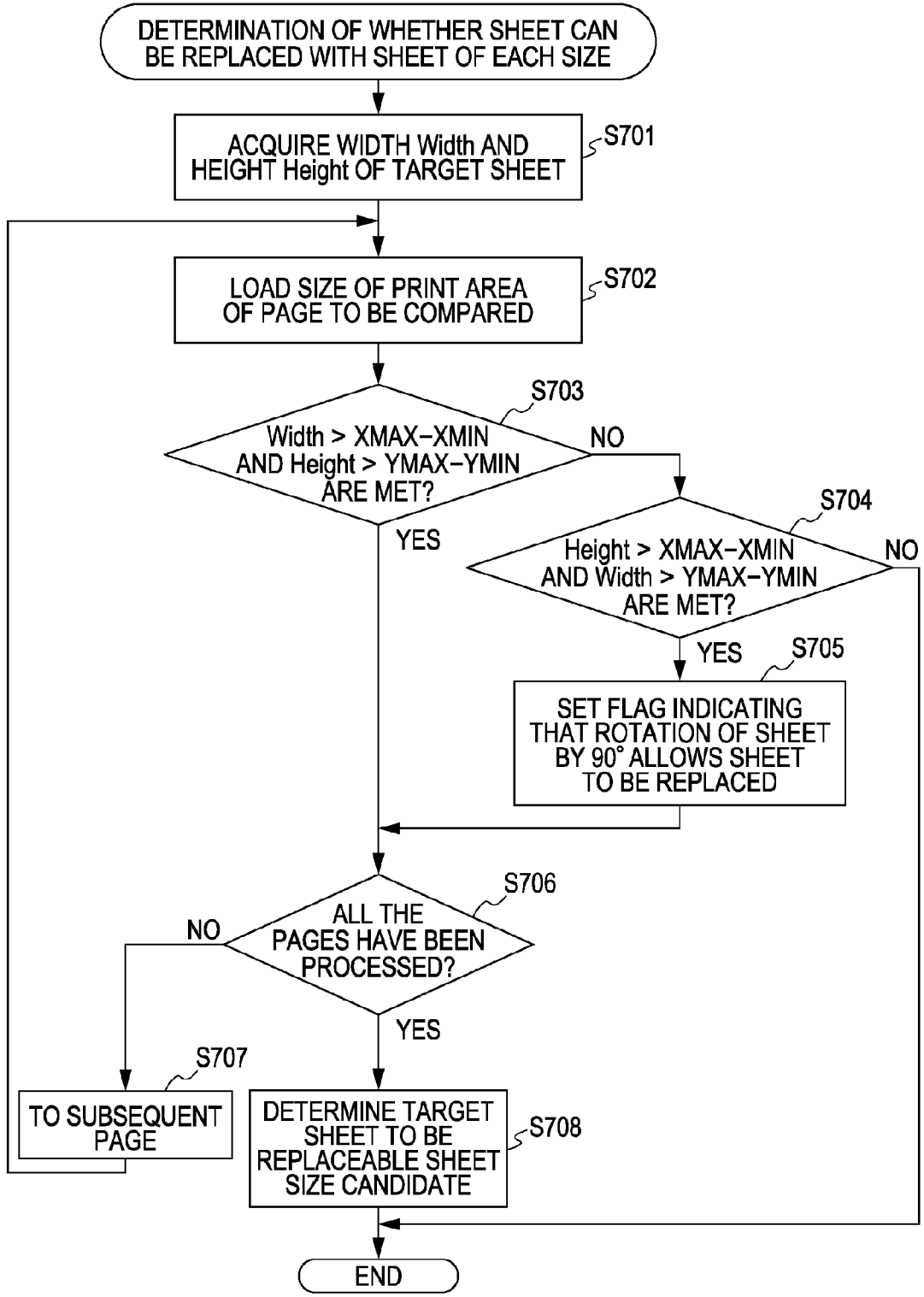
FIG. 7 is a flowchart showing an example of a third data processing procedure in the information processing apparatus according to the first embodiment of the present invention.

FIG. 7 is a flowchart showing an example of a third data processing procedure in the information processing apparatus according to the first embodiment of the present invention. The third data processing procedure corresponds to the determination of whether the sheet can be replaced with a sheet of each size in S305 in FIG. 3. The flowchart shown in FIG. 7 is used to determine whether the sheet can be replaced with a sheet of a different size. S701 to S708 show steps. The steps are realized by the CPU 100, which loads the network printer control program read out from the ROM 101 or the HD 105 into the RAM 102 and executes the loaded network printer control program.

A condition for replacing the sheet is that the size of the print area of the target sheet is larger than the size of the print area acquired by the printer driver in Step S303. The size of the print area of the target sheet fed from the printing apparatus 208 is determined by the width and height of the print area. Accordingly, the CPU 100 compares a width Width and a height Height of the print area of the target sheet with a width (XMAX-XMIN) and a height (YMAX-YMIN) of the size of the print area acquired in Step S303, respectively, to determine the possibility of replacing the sheet.

If the width Width is larger than the width (XMAX-XMIN) acquired in Step S303 and the height Height is larger than the height (YMAX-YMIN) acquired in Step S303, it is determined that the size of the print area of the target sheet is larger than the acquired size of the print area.

Referring to FIG. 7, in Step S701, the CPU 100 acquires a width Width and a height Height of the print area of the target sheet. In Step S702, the CPU 100 loads the coordinates (XMIN, YMIN) and (XMAX, YMAX) representing the size of the print area acquired in Step S303 into the wording area in the RAM 102.

In Step S703, the CPU 100 determines whether the variable Width is larger than XMAX-XMIN (Width>XMAX-XMIN: the first condition) and whether the variable Height is larger than YMAX-YMIN (Height>YMAX-YMIN: the second condition).

If the CPU 100 determines that both the first and second conditions are met, the CPU 100 determines that the size of the print area acquired in Step S303 is smaller than the size of the print area of the target sheet and that the target sheet can be replaced.

If the CPU 100 determines in Step S703 that at least one of the first and second conditions is not met, the CPU 100 determines that the size of the print area acquired in Step S303 is larger than the size of the print area of the target sheet and rotates the image data by 90° and performs the comparison again. This is because, for example, the rotation of the image data by 90° possibly allows the image data to be fit into an A4 sheet if the image area to be printed is located in the upper half of an A3 sheet.

In the comparison after the target image data in FIG. 3 is rotated by 90°, in Step S704, the CPU 100 determines whether the variable Height is larger than XMAX-XMIN (Height>XMAX-XMIN: the third condition) and whether the variable Width is larger than YMAX-YMIN (Width>YMAX-YMIN: the fourth condition). If the CPU 100 determines that both the third and fourth conditions are met, the CPU 100 determines that the target sheet can be replaced. In Step S705, the CPU 100 sets, in the RAM 102, a control flag indicating that rotation of the sheet by 90° allows the sheet to be replaced with another sheet.

If the CPU 100 determines that at least one of the third and fourth conditions is not met, the CPU 100 determines that the sheet cannot be replaced and terminates the third data processing procedure.

If the CPU 100 determines that the sheet can be replaced, in Step S706, the CPU 100 determines whether all the pages have been processed. If the CPU 100 determines that a page that has not been processed remains, then in Step S707, the CPU 100 determines whether the subsequent page can be replaced. The CPU 100 repeats the above steps until all the pages have been processed. If the all the pages can be replaced, then in Step S708, the CPU 100 determines the target sheet to be a replaceable sheet size candidate and terminates the third data processing procedure.

The determination of whether the target sheet can be replaced is performed in the above manner. In the third data processing procedure for the determination, the target sheet is not determined to be the replaceable sheet size candidate if even one page cannot be replaced while the target sheets are determined to be the replaceable sheet size candidates if the rotation of one or more pages allows the target sheets to be replaced.

However, for example, if even one page can be replaced, the target sheet may be determined to be the replaceable sheet size candidate because the page can be replaced. Even if the rotation of one or more pages allows the target sheets to be replaced, the target sheets may not be determined to be the replaceable sheet size candidates.

It is noted that a user may choose the setting of the determination. For example, the user may choose the setting in a dialog box on a UI screen provided by the printer driver.

Figure 8:
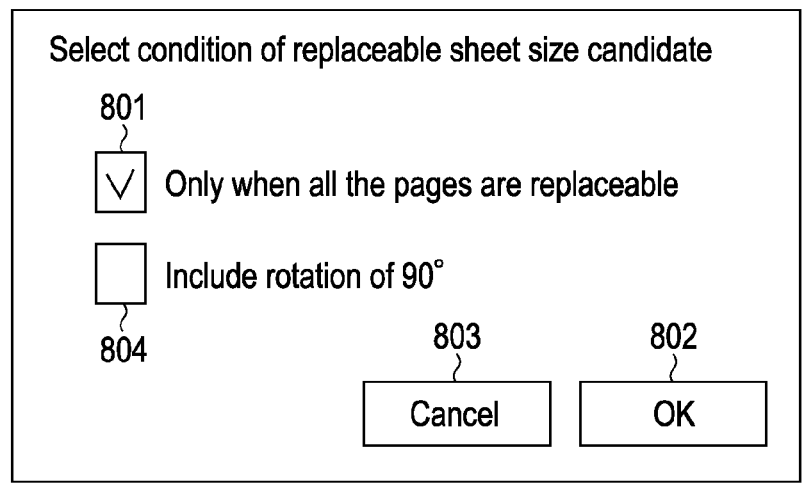
FIG. 8 shows an example of a UI screen provided by a printer driver of the information processing apparatus according to the first embodiment of the present invention.

FIG. 8 shows an example of a UI screen provided by the printer driver of the information processing apparatus according to the first embodiment of the present invention. The UI screen in FIG. 8 is displayed in the display 107 in FIG. 1 under the control of the CPU 100.

Referring to FIG. 8, the UI screen includes check boxes 801 and 804 used for setting conditions of the determination of the replaceable sheet size candidate. Checking the check box 801 selects a condition that the target sheet should be determined to be the replaceable sheet size candidate only if all the pages can be replaced and should not be determined to be the replaceable sheet size candidate if the rotation of the print area by 90° is required.

Checking the check box 804 selects a condition that the target sheet should be determined to be the replaceable sheet size candidate even if the rotation of the print area by 90° is required.

According to the first embodiment of the present invention, the conditions of the determination of the replaceable sheet size candidate are listed on the UI screen and the user checks the check box 801. In the example shown in FIG. 8, the condition that the target sheet should be determined to be the replaceable sheet size candidate only if all the pages can be replaced and should not be determined to be the replaceable sheet size candidate if the rotation of the print area by 90° is required is selected.

If the user agrees with the condition selected with the check box 801, the user presses an OK button 802 with, for example, a pointing device (not shown). If the user presses a Cancel button 803 with the pointing device, the condition that was previously set is selected.

Referring back to FIG. 3, in Step S306, the CPU 100 determines whether the determination in Step S305 is performed for all the replaceable sheet size candidates. If the CPU 100 determines that any replaceable sheet size candidate that is not determined remains, then in Step S307, the CPU 100 displays a sheet size changing screen in the display 107. If the CPU 100 determines that the determination in step S305 is performed for all the replaceable sheet size candidates, the CPU 100 goes to Step S310. In Step S310, the CPU 100 transmits the print data to the printing apparatus 208 where the print data is printed and terminates the first data processing procedure. Steps S308 to S310 will be described below.

Figure 9:
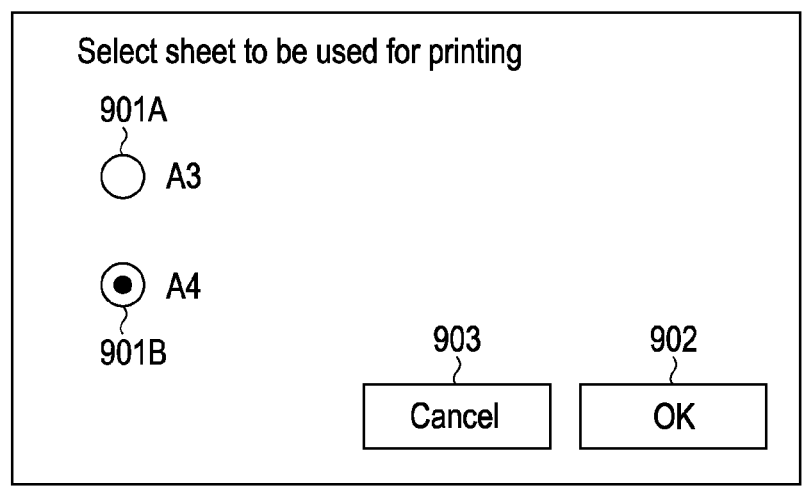
FIG. 9 shows an example of a sheet size changing screen displayed in a display in FIG. 1.
Figure 10:
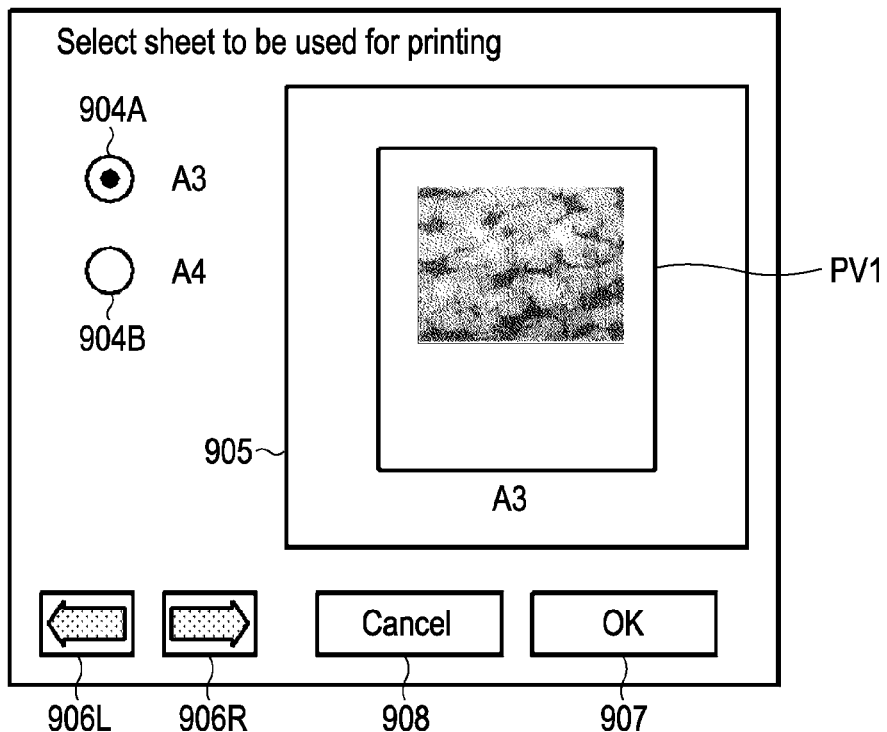
FIG. 10 shows another example of the sheet size changing screen displayed in the display in FIG. 1.
Figure 11:
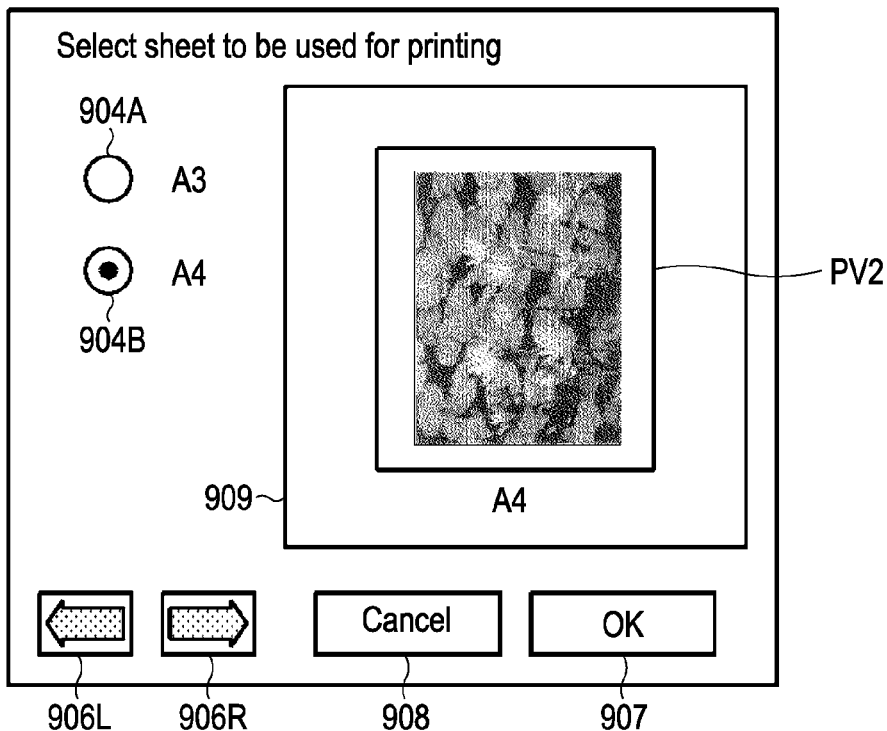
FIG. 11 shows another example of the sheet size changing screen displayed in the display in FIG. 1.

FIGS. 9 to 11 show examples of the sheet size changing screen displayed in the display 107 in FIG. 1.

An example of the sheet size changing screen shown in FIG. 9 includes radio buttons 901A and 901B used for selecting sheet sizes. The radio buttons 901A and 901B are displayed if it is determined that replaceable sheet size candidates are set in the printing apparatus 208 and if neither any image reduction process nor any image enlargement process is performed to the image data to be printed. The sheet size changing screen also includes a Cancel button 903 and an OK button 902.

The content of the sheet size changing screen in FIG. 9 is varied depending on whether a preview image is displayed or not. First, an operation performed when a preview image is not to be displayed will now be described.

As shown in FIG. 9, the radio buttons 901A and 901B corresponding to the replaceable sheet size candidates are displayed. The user chooses a sheet size by pressing the radio button 901A or 901B. If the user presses the OK button 902 to enable the printing, the print data is printed on a sheet of the selected size.

If the user presses the Cancel button 903 on the sheet size changing screen, the print data is printed on a sheet of the size that was previously set.

Next, an operation performed when a preview image is to be displayed will now be described with reference to sheet size changing screens shown in FIGS. 10 and 11.

When a preview image is to be displayed, a screen including radio buttons 904A and 904B corresponding to the replaceable sheet size candidates is displayed under the control of the CPU 100, as in an example shown in FIG. 10. When the user presses the radio button 904A corresponding to A3, a preview PV1 is displayed in a preview area 905 of the selected sheet size under the control of the CPU 100. Since the radio button 904A corresponding to A3 is checked and the image data to be output can be fit into the upper half of the A3 sheet, the lower half of the A3 sheet is blank.

Pressing a left arrow button 906L or a right arrow button 906R allows a preview image of the previous or next page to be displayed. When the user presses an OK button 907, the printing apparatus 208 prints the print data on a sheet of the selected size.

When the user presses a Cancel button 908, the printing apparatus 208 prints the print data on a sheet of the size that was previously set.

If a replaceable sheet size candidate that can be replaced when the print data shown in FIG. 10 is rotated by 90° is selected, the radio buttons 904A and 904B are displayed. When the user presses the radio button 904B corresponding to A4, a preview PV2 is displayed in a preview area 909 of the sheet after the replacement under the control of the CPU 100, as in an example shown in FIG. 11.

Data concerning the bitmap image generated from the raster image data by the PGD 206 is loaded (S414) in order to show a preview image. The position of the bitmap image is calculated to display the preview PV1 or PV2 on the preview area 905 or 909.

According to the first embodiment of the present invention, the following functional processes are performed in the configuration in which the information processing apparatus in FIG. 1 generates the spool file of each page from the received drawing information via the printer driver and extracts the spool file to transmit the print data to the printing apparatus.

Specifically, the information processing apparatus has the function of acquiring the print area from the spool file (Windows Metafile) of each page, performed by the GDI 202. The print-area acquiring function corresponds to the acquisition procedure shown in FIG. 4.

The information processing apparatus also has the determination function of comparing the print area acquired in the print-area acquiring process with the print area of the target sheet fed from the printing apparatus 208 to determine whether the sheet can be replaced with a sheet having a sheet size smaller than the sheet size specified in the print data. This determination function corresponds to the procedure for determining whether the sheet can be replaced with a sheet of each size shown in FIG. 7.

The information processing apparatus further has the function of displaying the sheet size changing screen (the example of the screen shown in FIG. 9, 10, or 11) in the display if the information processing apparatus determines in the determination process that the sheet can be replaced with a sheet having a smaller sheet size. Information concerning the sheet sizes with which the size of the sheet can be replaced is displayed in the sheet size changing screen. The user can confirm that replaceable sheet size candidates which have sizes smaller than the sheet size specified by the application and on which the entire print data can be printed are set in the printing apparatus.

The information processing apparatus adds the print control command used for changing the sheet size specified in the input drawing information to the sheet size selected on the sheet size changing screen to the print data and transmits the print data with the print control command added to the printing apparatus 208.

If the user selects special paper, for example, a type of sheet such as photographic paper, it is not necessary to change the sheet size in the first embodiment of the present invention. The information processing apparatus has the type determination function of determining whether the type of the sheet specified in the print data is supported by the printer driver and whether the sheet is of the type whose size can be changed. This type determination function corresponds to Step S302 in FIG. 3.

If the information processing apparatus determines in the type determination that the sheet is of the type whose size cannot be changed, for example, if the information processing apparatus determines that a sheet of photographic paper is specified in the print data, the information processing apparatus goes from Step S302 to Step S310 in FIG. 3. The information processing apparatus transmits the print data of each page, generated by the printer driver, to the printing apparatus without changing the sheet size specified in the print data.

The print-area acquiring function described above includes the first print-area acquiring function in which an extraction instruction of the spool file of each page is analyzed to acquire the print area. The print-area acquiring function further includes the second print-area acquiring function in which the image data extracted on the basis of the extraction instruction of the spool file of each page is scanned to acquire the print area. The second print-area acquiring function is provided because it is necessary to switch to an effective acquiring function in order to show a preview image when the user selects the print-area acquisition function having a higher processing speed in the selection of the sheet.

Accordingly, the information processing apparatus has the previewing determination function of determining whether the previewing is turned on for the print data. Specifically, the previewing determination function corresponds to the determination of whether turning on of the previewing is requested by the user in Step S400 in FIG. 4.

If the information processing apparatus determines that the previewing is turned on, the information processing apparatus selects the second print-area acquiring function (the acquisition of the size of the print area by extracting the image data). If the information processing apparatus determines that the previewing is turned off, the information processing apparatus selects the first print-area acquiring function.

The determination function described above compares the print area acquired by using the print-area acquiring function with the print area of the target sheet fed from the printing apparatus.

If the information processing apparatus determines that the sheet size cannot be replaced with a sheet size smaller than the sheet size specified in the print data, the information processing apparatus compares the rotated print area given by rotating the acquired print area by 90° with the print area of the target sheet to determine whether the sheet size specified in the print data can be replaced with a smaller sheet size. This comparison and determination are performed because the rotation of the acquired print area by 90° possibly allows the print area to be fit into a sheet of the smaller size. For example, if the print area can be fit into the upper half of an A3 sheet, the rotation of the print area allows the print area to be fit into an A4 sheet.

Accordingly, the print-area determination process in the determination function may be based on an area determination condition indicating whether both the print area acquired by the print-area acquiring function and the rotated print area given by rotating the print area by 90° are included. For example, switching of the area determination condition on the basis of which check box of the multiple check boxes provided in the UI screen is checked, as in the example shown in FIG. 8, increases the possibility of selecting a sheet of a smaller size.

With the function of displaying the sheet size changing screen, if the information processing apparatus determines that the sheet can be replaced with a sheet of a smaller size, as in the examples shown in FIGS. 9 to 11, the replaceable sheet size candidates and the sheet size specified in the print data are displayed.

Accordingly, it is possible for the user to select a sheet of a smaller size or to select a sheet of a larger size (the same size as that specified by the application) in order to print the print data on the selected sheet.

Example Modification of First Embodiment

According to a modification of the first embodiment of the present invention, a check box used for requesting image zooming is also provided in the sheet size changing screen shown in FIGS. 9 to 11.

If this check box is checked, the size of the image data area is enlarged or reduced so that the image data area is fit into the print area of the sheet, yielded by adding a margin to the selected sheet size.

In the printing of the print data on the determined sheet, there are two cases in which the size of the selected sheet is the same as the sheet size set by the application and in which the size of the sheet has been replaced by using the sheet size changing screen.

Specifically, in Step S308 in FIG. 3, the CPU 100 determines whether the sheet size has been replaced. If the CPU 100 determines that the sheet size that was originally set is selected with the sheet size changing screen, the CPU 100 goes to Step S310 to print the print data.

If the CPU 100 determines that the sheet size has been replaced, then in Step S309, the CPU 100 resets the print setting information set by the application to the type and size of the sheet set by the print processor 205 and to the paper feed tray where the sheet is set. The CPU 100 transmits the print setting information that is reset to the printing apparatus 208 and, in Step S310, performs the printing.

According to the modification of the first embodiment of the present invention, the information processing apparatus communicates with the printing apparatus 208 to acquire the type and size of the sheet set in the paper feed tray of the printing apparatus 208 and to determine whether the sheet is of the type whose size can be changed. The information processing apparatus compares the acquired size of the sheet with the print area of the print data generated by the printer driver. If the sheet is of the type whose size can be changed, it is possible to replace the size of the sheet with an optimal size so as to eliminate an excess blank space on the print output.

Second Exemplary Embodiment

According to the first embodiment and the modification thereof of the present invention described above, the information processing apparatus acquires the type and size of the sheet set in the printing apparatus 208 from the printing apparatus 208 in Step S301 in FIG. 3 and determines whether the sheet is of the type whose size can be changed in Step S302. In addition, the width and height of the print area of the target sheet are determined on the basis of the size of the sheet set in the printing apparatus 208, acquired in Step S301 in FIG. 3.

However, according to a second embodiment of the present invention, the information processing apparatus may communicate with the printing apparatus 208 to acquire the type and size of the sheet set in the printing apparatus 208 before starting the printing and may store the acquired type and size in the RAM 102 or the HD 105. In this case, it is not necessary to acquire the type and size of the sheet from the printing apparatus 208 each time the sheet size is replaced, thus improving the efficiency of the changing of the sheet size.

Third Exemplary Embodiment

An example of the configuration of data processing programs which the information processing apparatus according to the embodiments of the present invention can read will now be described with reference to a memory map shown in FIG. 12.

FIG. 12 illustrates the memory map of a storage medium storing various data processing programs which the information processing apparatus according to the embodiments of the present invention can read.

Although not shown in FIG. 12, information used for managing program code groups stored in the storage medium, for example, version information and the name of the creator, are also stored in the storage medium. In addition, information depending on the OS of the computer reading the programs, for example, icons used for identifying and displaying the programs, may be stored in the storage medium.

Data depending on the various programs is stored in directories in the storage medium. In addition, programs used for installing the various programs in the computer and programs used for decompressing the programs to be installed, if the programs to be installed are compressed, may be stored in the storage medium.

The functions shown in FIGS. 3, 4, and 7 according to the embodiments of the present invention may be performed by a host computer with programs externally installed. In this case, information groups including the programs may be supplied from a storage medium, such as a CD-ROM, a flash memory, or an FD, to an output apparatus or may be downloaded from an external storage medium to the output apparatus via a network.

The present invention can be embodied by supplying a storage medium having the program code of software realizing the functions according to the above embodiments to a system or an apparatus, the computer (or the CPU or the micro processing unit (MPU)) in which system or apparatus reads out and executes the program code stored in the storage medium.

In this case, the program code itself read out from the storage medium realizes the functions of the embodiments described above. The present invention is applicable to the storage medium having the program code stored therein.

Accordingly, the program code may be any program, such as an object code, a program executed by an interpreter, or script data supplied to the OS, as long as the program code has the function of the program.

The storage medium supplying the program may be any storage medium, such as a flexible disk, a hard disk, an optical disk, an MO, a CD-ROM, a CD-R, a CD-RW, a magnetic tape, a nonvolatile memory card, a ROM, or a DVD.

The program may be supplied by accessing an Internet home page by using the browser in a client computer to download the computer program itself or a compressed file including an automatic installation function from the home page to a storage medium such as a hard disk.

The program code constituting the program according to the embodiments of the present invention may be divided into multiple files, which are downloaded from different home pages. In other words, a world wide web (WWW) server or an ftp server from which the program file for enabling the computer to realize the functions according to the embodiments of the present invention is downloaded to multiple users is also included in the appended claims of the present invention.

Alternatively, the program according to the embodiments of the present invention, which is encrypted and stored in a storage medium such as a CD-ROM, may be distributed to users, cryptographic-key information for deciphering the code may be supplied from a home page to users who satisfy predetermined conditions over the Internet, and the users may install in the computer the program deciphered by using the cryptographic-key information.

The functions of the embodiments of the present invention can be realized by the computer that reads out and executes the readout program code.

The functions according to the above embodiments of the present invention can also be realized by the OS or the like, running on the computer, which executes all or part of the actual processing based on the instructions in the program.

Furthermore, after the program code read out from the storage medium has been written in a memory that is provided in an expansion board included in the computer or in an expansion unit connected to the computer, the CPU or the like in the expansion board or the expansion unit can execute all or part of the actual processing based on the instructions in the program to realize the functions of the above embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-216556 filed Aug. 9, 2006, which is hereby incorporated by reference herein in its entirety.

What is claimed is:

1. An information processing apparatus comprising:
   a first acquisition unit configured to acquire a print area of an image;
   a second acquisition unit configured to acquire a sheet candidate;
   a first determination unit configured to determine whether or not the print area of the image fits within a sheet size of the sheet candidate;
   a second determination unit configured to determine whether or not the print area of the image being rotated by 90 degrees fits within the sheet size of the sheet candidate in a case where the first determination unit determines that the print area of the image does not fit within the sheet size of the sheet candidate;
   a display unit configured to display a sheet candidate in which the print area of the image fits and a sheet candidate in which the print area of the image being rotated by 90 degrees fits;
   and a changing unit configured to change a print setting to print the image on a sheet selected from the plurality of sheet candidates displayed in the display unit;
   wherein the first acquisition unit acquires the print area from raster image data of the image data in response to previewing being turned on or acquires the print area by checking coordinates of a clip area from spool data in response to previewing being turned off.

2. The information processing apparatus according to claim 1, wherein the display unit displays any sheet candidate which is smaller than the sheet size set in the print setting and on which the image of the print area acquired by the first acquisition unit can be printed.

3. The information processing apparatus according to claim 1, wherein the display unit displays a preview image corresponding to the selected sheet.

4. The information processing apparatus according to claim 1, further comprising a transmission unit configured to transmit the print data to be printed in the sheet size set in the print setting to a printer in response to there not being a sheet candidate which is smaller than the sheet size set in the print setting and on which the image of the print area acquired by the first acquisition unit can be printed.

5. The information processing apparatus according to claim 1, wherein a type of the sheet which requires the change of the print setting by the changing unit includes plain paper and a type of the sheet which does not require the change of the print setting by the changing unit includes photographic paper and a compact disc-recordable (CD-R).

6. The information processing apparatus according to claim 1,
   wherein, in response to previewing being turned on, the display unit displays a check box to designate a first condition for determining a sheet selectable for all pages as a sheet candidate and another check box to designate a second condition for determining a sheet selectable for a page rotated by ninety degrees, and either one of or both of the first condition and the second condition can be designated.

7. The information processing apparatus according to claim 1,
   wherein, in response to previewing being turned on, the display unit displays a cancel button to cancel changing the print setting concerning a sheet, and
   wherein the cancel button is pressed, an instruction is issued to the printer for printing the image on the sheet having the sheet size set in the print setting.

8. The information processing apparatus according to claim 1,
wherein the display unit displays a user interface for selecting the sheet from the plurality of sheet candidates for printing the image of the print area acquired by the first acquisition unit in a different form depending on whether previewing is turned on or turned off.

9. An information processing method performed in an information processing apparatus including a processor and memory, the information processing method comprising:
acquiring a print area of an image;
acquiring a sheet candidate;
determining, by a first determination unit, whether or not the print area of the image fits within a sheet size of the sheet candidate;
determining, by a second determination unit, whether or not the print area of the image being rotated by 90 degrees fits within the sheet size of the sheet candidate in a case where the first determination unit determines that the print area of the image does not fit within the sheet size of the sheet candidate;
displaying a sheet candidate in which the print area of the image fits and a sheet candidate in which the print area of the image being rotated by 90 degrees fits; and
changing, using the processor and memory, a print setting to print the image on a sheet selected from the displayed plurality of sheet candidates;
wherein acquiring the print area of an image includes acquiring the print area from raster image data of the image data in response to previewing being turned on or acquiring includes acquiring the print area by checking coordinates of a clip area from spool data in response to previewing being turned off.

10. The information processing method according to claim 9, wherein displaying includes displaying any sheet candidate which is smaller than the sheet size set in the print setting and on which the image of the acquired print area can be printed.

11. The information processing method according to claim 9, wherein displaying includes displaying a preview image corresponding to the selected sheet.

12. The information processing method according to claim 9, further comprising transmitting the print data to be printed in the sheet size set in the print setting to a printer in response to there not being a sheet candidate which is smaller than the sheet size set in the print setting and on which the image of the acquired print area can be printed.

13. A non-transitory computer readable storage medium storing a program that causes an information processing apparatus to perform the information processing method according to claim 9.

14. The non-transitory computer-readable storage medium according to claim 13, wherein displaying includes displaying any sheet candidate which is smaller than the sheet size set in the print setting and on which the image of the acquired print area can be printed.

15. The non-transitory computer-readable storage medium according to claim 13, wherein displaying includes displaying a preview image corresponding to the selected sheet.

16. The non-transitory computer-readable storage medium according to claim 13, further comprising transmitting the print data to be printed in the sheet size set in the print setting to a printer in response to there not being a sheet candidate which is smaller than the sheet size set in the print setting and on which the image of the acquired print area can be printed.

17. The information processing method according to claim 9, wherein a type of the sheet which requires the change of the print setting includes plain paper and a type of the sheet which does not require the change of the print setting includes photographic paper and a compact disc-recordable (CD-R).

18. The non-transitory computer-readable storage medium according to claim 13, wherein a type of the sheet which requires the change of the print setting includes plain paper and a type of the sheet which does not require the change of the print setting includes photographic paper and a compact disc-recordable (CD-R).

19. The information processing method according to claim 9,
wherein, in response to previewing being turned on, displaying includes displaying a check box to designate a first condition for determining a sheet selectable for all pages as a sheet candidate and another check box to designate a second condition for determining a sheet selectable for a page rotated by ninety degrees, and either one of or both of the first condition and the second condition can be designated.

20. The information processing method according to claim 9,
wherein, in response to previewing being turned on, displaying includes displaying a cancel button to cancel changing the print setting concerning a sheet, and
wherein the cancel button is pressed, an instruction is issued to the printer for printing the image on the sheet having the sheet size set in the print setting.

21. The information processing method according to claim 9,
wherein displaying includes displaying a user interface for selecting the sheet from the plurality of sheet candidates for printing the image of the acquired print area in a different form depending on whether previewing is turned on or turned off.

22. The non-transitory computer-readable storage medium according to claim 13,
wherein, in response to previewing being turned on, displaying includes displaying a check box to designate a first condition for determining a sheet selectable for all pages as a sheet candidate and another check box to designate a second condition for determining a sheet selectable for a page rotated by ninety degrees, and either one of or both of the first condition and the second condition can be designated.

23. The non-transitory computer-readable storage medium according to claim 13,
wherein, in response to previewing being turned on, displaying includes displaying a cancel button to cancel changing the print setting concerning a sheet, and
wherein the cancel button is pressed, an instruction is issued to the printer for printing the image on the sheet having the sheet size set in the print setting.

24. The non-transitory computer-readable storage medium according to claim 13,
wherein displaying includes displaying a user interface for selecting the sheet from the plurality of sheet candidates for printing the image of the acquired print area in a different form depending on whether previewing is turned on or turned off.

* * * * *